United States Patent
Simmons

(10) Patent No.: US 11,910,755 B2
(45) Date of Patent: Feb. 27, 2024

(54) AGRICULTURAL BALER WITH CONTROLLED WRAPPING MATERIAL BRAKE

(71) Applicant: CNH Industrial America LLC, New Holland, PA (US)

(72) Inventor: Scott C. Simmons, Litiz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/093,382

(22) Filed: Jan. 5, 2023

(65) Prior Publication Data
US 2023/0148478 A1  May 18, 2023

Related U.S. Application Data

(62) Division of application No. 17/319,506, filed on May 13, 2021, now Pat. No. 11,570,952.

(51) Int. Cl.
*A01F 15/07* (2006.01)

(52) U.S. Cl.
CPC .... *A01F 15/0715* (2013.01); *A01F 2015/072* (2013.01)

(58) Field of Classification Search
CPC ............ A01F 15/0715; A01F 2015/072; A01F 2015/076
See application file for complete search history.

(56) References Cited

U.S. PATENT DOCUMENTS

| | | | |
|---|---|---|---|
| 5,581,976 A * | 12/1996 | Underhill | A01F 15/141 53/399 |
| 6,295,797 B1 | 10/2001 | Naaktgeboren et al. | |
| 6,644,006 B1 | 11/2003 | Merritt et al. | |
| 6,688,092 B2 | 2/2004 | Antsey et al. | |
| 6,877,304 B1 | 4/2005 | Smith et al. | |
| 6,883,422 B2 | 4/2005 | Viaud et al. | |
| 7,908,822 B2 * | 3/2011 | McClure | A01F 15/0715 53/64 |
| 9,376,227 B2 * | 6/2016 | Smith | B65B 13/04 |
| 9,706,716 B2 * | 7/2017 | Smith | A01F 15/0715 |
| 10,440,895 B2 | 10/2019 | Eubanks et al. | |

(Continued)

FOREIGN PATENT DOCUMENTS

| | | |
|---|---|---|
| EP | 3199015 A1 | 8/2017 |
| EP | 3300586 A1 | 4/2018 |
| WO | 2013/124836 A1 | 9/2013 |

*Primary Examiner* — Andrew M Tecco
(74) *Attorney, Agent, or Firm* — Peter K. Zacharias

(57) ABSTRACT

A wrapping assembly includes: a material roll configured to hold a roll of wrapping material; a duckbill assembly including a duckbill carrying a duckbill roll and configured to draw material from a roll of wrapping material held by the material roll; a duckbill actuator coupled to the duckbill to move the duckbill between an insert position and a home position; a variable brake associated with the material roll and configured to apply a variable braking force to the material roll; and a controller operatively coupled to the duckbill actuator and the brake. The controller is configured to: determine an averaged electric current draw of the duckbill actuator during a sampling period is below a defined value and responsively output a brake increase signal so the brake increases applied braking force to the material roll by a defined amount.

4 Claims, 8 Drawing Sheets

(56) References Cited

U.S. PATENT DOCUMENTS

| | | | |
|---|---|---|---|
| 10,501,282 B2 | 12/2019 | Frascella et al. | |
| 10,827,685 B2* | 11/2020 | Talsma | A01F 15/0715 |
| 2012/0240527 A1* | 9/2012 | Herron | A01F 15/0715 |
| | | | 53/64 |
| 2014/0053510 A1* | 2/2014 | Smith | A01F 15/0715 |
| | | | 53/461 |
| 2016/0183474 A1* | 6/2016 | Thoreson | B65B 57/04 |
| | | | 53/399 |
| 2017/0273247 A1* | 9/2017 | Smith | A01F 15/0715 |
| 2020/0323145 A1 | 10/2020 | Lebeau et al. | |
| 2021/0051855 A1* | 2/2021 | Simmons | A01F 15/0858 |

* cited by examiner

AGRICULTURAL BALER WITH CONTROLLED WRAPPING MATERIAL BRAKE

FIELD OF THE INVENTION

The present invention pertains to agricultural vehicles and, more specifically, to agricultural balers.

BACKGROUND OF THE INVENTION

For many years harvesters, such as agricultural balers, have been used to consolidate and package crop material to facilitate the storage and handling of the crop material for later use. Usually, a mower-conditioner cuts and conditions the crop material for windrow drying in the sun. When the cut crop material is properly dried, a harvester, such as a round baler, travels along the windrows to pick up the crop material and form it into cylindrically-shaped round bales.

More specifically, pickups of the baler gather the cut and windrowed crop material from the ground, then convey the cut crop material into a bale-forming chamber within the baler. A drive mechanism operates to activate the pickups, augers, and a rotor of the feed mechanism. A conventional baling chamber may include a pair of opposing sidewalls with a series of belts that rotate and compress the crop material into a cylindrical shape.

When the bale has reached a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

To wrap the bale, the wrapping system executes a net wrapping cycle during which an actuator powers a rotating arm, also referred to as a duckbill, to move from a home position to an insert position to guide the net around the bale, and then to retract the duckbill from the insert position back to the home position once the bale is wrapped. In certain circumstances, tension in the net is not held at desired values.

What is needed in the art is a baler that can address at least some of the previously described issues with known balers.

SUMMARY OF THE INVENTION

Exemplary embodiments disclosed herein provide a wrapping assembly with a variable brake that is controlled to increase a braking force applied to a material roll when an averaged electric current draw of a duckbill actuator is below a defined value.

In some exemplary embodiments provided according to the present disclosure, a wrapping assembly for an agricultural baler includes: a material roll configured to hold a roll of wrapping material; a duckbill assembly including a duckbill carrying at least one duckbill roll and configured to draw material from a roll of wrapping material held by the material roll, the duckbill being movable between an insert position and a home position; a duckbill actuator coupled to the duckbill and configured to move the duckbill between the insert position and the home position; a variable brake associated with the material roll and configured to apply a variable braking force to the material roll; and a controller operatively coupled to the duckbill actuator and the brake. The controller is configured to: determine an averaged electric current draw of the duckbill actuator during a sampling period is below a defined value; and output a brake increase signal so the brake increases applied braking force to the material roll by a defined amount when the averaged electric current draw is below the defined value.

In some exemplary embodiments provided according to the present disclosure, an agricultural baler includes a chassis; a baling chamber carried by the chassis; and a wrapping assembly carried by the chassis. The wrapping assembly includes: a material roll configured to hold a roll of wrapping material; a duckbill assembly including a duckbill carrying at least one duckbill roll and configured to draw material from a roll of wrapping material held by the material roll, the duckbill being movable between an insert position and a home position; a duckbill actuator coupled to the duckbill and configured to move the duckbill between the insert position and the home position; a variable brake associated with the material roll and configured to apply a variable braking force to the material roll; and a controller operatively coupled to the duckbill actuator and the brake. The controller is configured to: determine an averaged electric current draw of the duckbill actuator during a sampling period is below a defined value; and output a brake increase signal so the brake increases applied braking force to the material roll by a defined amount when the averaged electric current draw is below the defined value.

In some exemplary embodiments provided according to the present disclosure, a method of controlling a wrapping assembly of an agricultural baler is provided. The wrapping assembly includes a material roll holding a roll of wrapping material, a duckbill including a movable duckbill carrying at least one duckbill roll and configured to draw wrapping material from the roll of wrapping material, a duckbill actuator coupled to the duckbill, and a variable brake coupled to the material roll. The method includes: determining an averaged electric current draw of the duckbill actuator during a sampling period is below a defined value; and increasing an applied braking force to the material roll by a defined amount with the brake when the averaged electric current draw is below the defined value.

One possible advantage that may be realized by exemplary embodiments disclosed herein is that the controller can cause the brake to increase the applied braking force to the material roll when the averaged electric current draw of the duckbill actuator is below the defined value, which corresponds to overly low resistance and tension of drawn wrapping material.

Another possible advantage that may be realized by exemplary embodiments disclosed herein is that the controller can progressively increase the applied braking force over multiple extension and retraction cycles of the duckbill if the previous increase(s) does not increase the averaged electric current draw to the defined value.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Agricultural balers, such as round balers, are well known in the agricultural industry, and the instant invention can be used with substantially any of such machines. Reference is made, for example, to U.S. Pat. Nos. 6,877,304; 6,688,092; 6,644,006; and 6,295,797 that illustrate such balers, the disclosures of which are incorporated herein by reference in their entirety. For illustrative purposes, details of an exemplary round baler in which the features of the present invention may be used are disclosed in and will be described here in part with reference to U.S. Pat. No. 5,581,976, which is also hereby incorporated by reference in its entirety.

Figure 1:
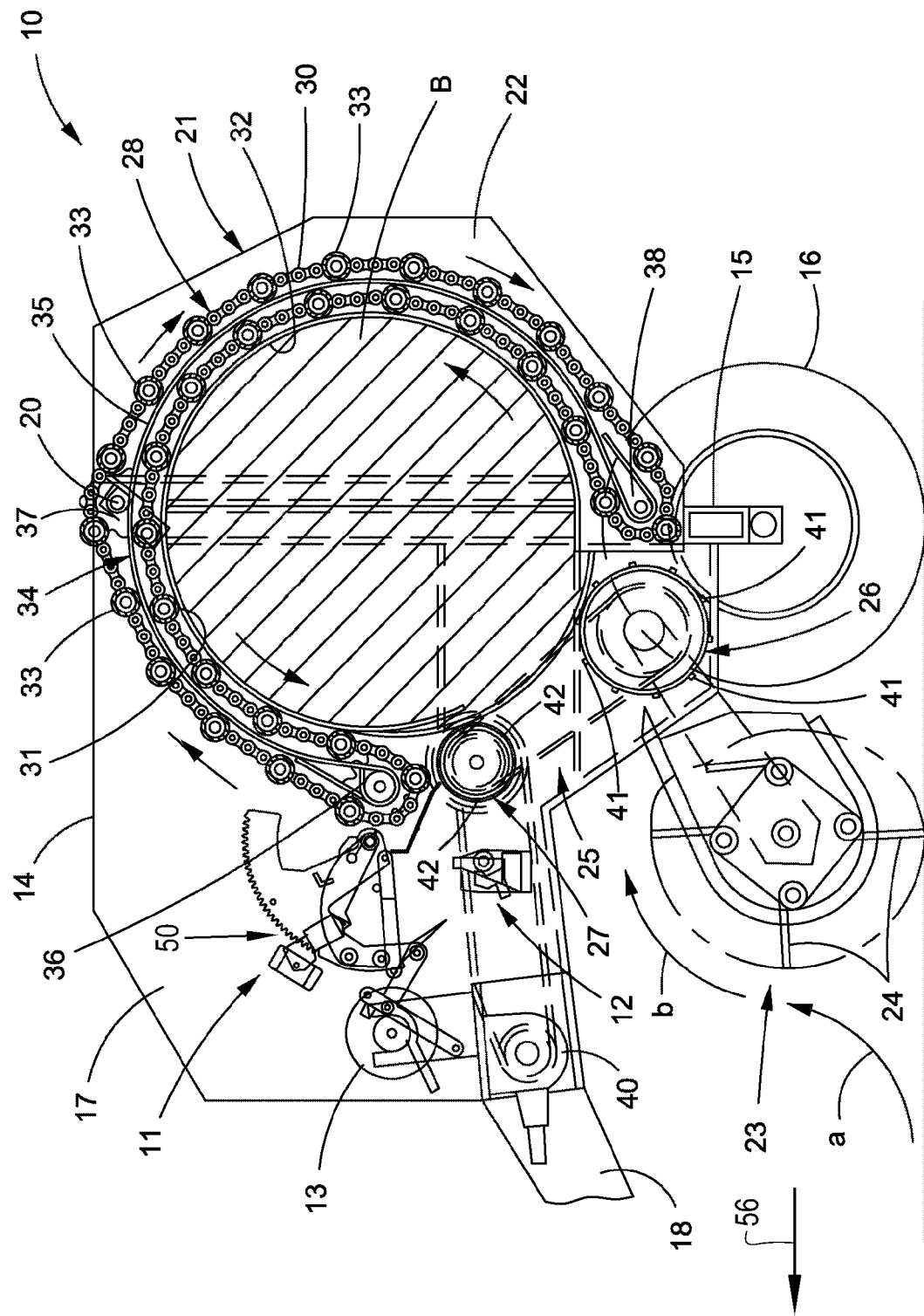
FIG. 1 illustrates a sectional view of an exemplary embodiment of an agricultural baler including a wrapping assembly, provided in accordance with the present disclosure.

FIG. 1 depicts an exemplary agricultural round baler, generally designated 10, in which embodiments of the present invention may be employed. As previously noted, crop in the field is usually arranged in a windrow as it is engaged by the baler 10 being pulled along the windrow of cut crop material by a tractor (not shown).

FIG. 1 illustrates a fixed chamber round baler 10 having a wrapping system for wrapping a cylindrical package of crop material (not shown) formed in a round baler 10. More particularly, the wrapping system of baler 10 comprises a wrapping assembly 11 and a cutting assembly 12 for cutting wrapping material, such as net, issued from a material roll 13.

As shown, round baler 10 includes a chassis 14 with a main support beam 15 on which a pair of wheels 16 (only one shown) are rotatably affixed. The chassis carries a cylindrical baling chamber including sidewalls 17. For the purposes of clarity only one wall 17 is shown in FIG. 1 and the elements mounted inwardly thereof are shown in full lines for clarity. For illustrative purposes reference letter B is used to designate a bale, shown in cross section in the chamber.

Baler 10 also includes a tongue 18 extending from the forward portion of chassis 14 for conventional connection to a tractor (not shown). Pivotally connected to the sidewalls of chassis 14 by a pair of stub shafts 20 is tailgate 21 which may be closed, as shown throughout the drawings, during bale formation or pivoted open about stub shafts 20 to discharge a completed bale. The tailgate includes tailgate walls 22 coextensive with side walls 17. A pickup assembly 23 mounted on chassis 14 in a suitable manner includes a plurality of fingers or tines 24 movable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on chassis 14 between sidewalls 17.

As shown, the baling chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, 35 of continuous cylindrical bale chamber wall. These sections, also separable during bale discharge, are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The baling chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the baling chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

Figure 2:
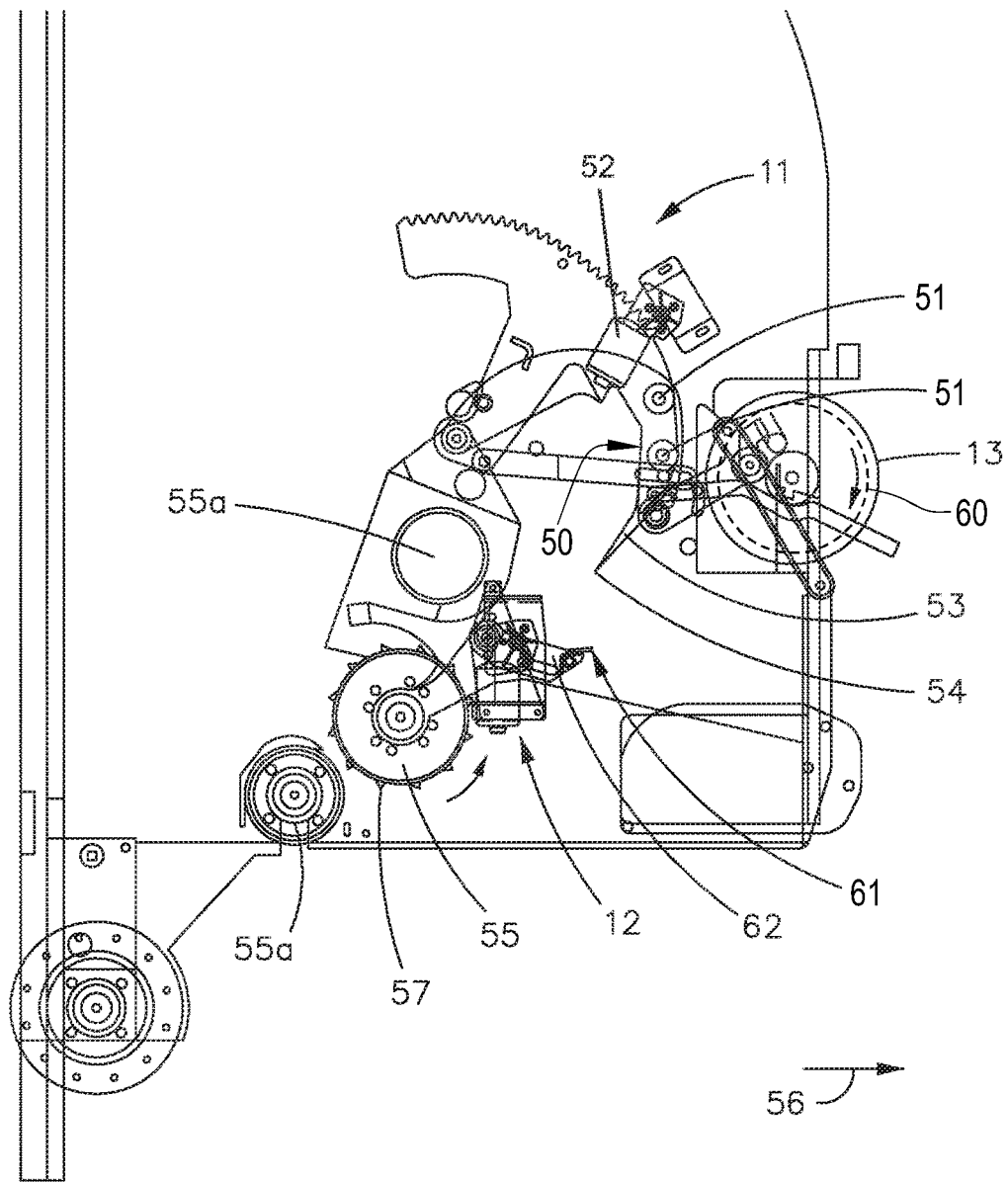
FIG. 2 illustrates a side view of an exemplary embodiment of a wrapping assembly with a duckbill in a home position.
Figure 3:
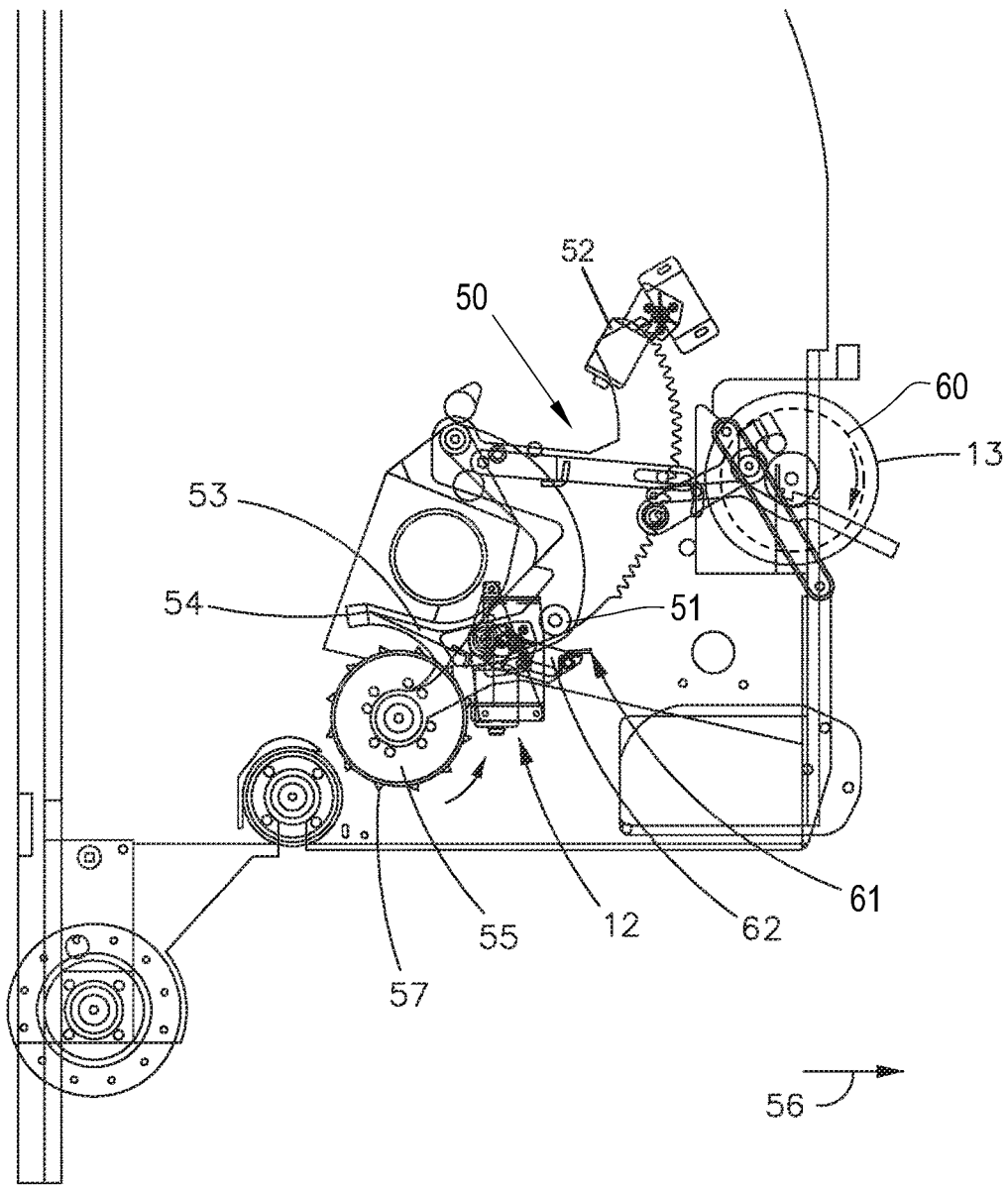
FIG. 3 illustrates a cross-sectional view of the wrapping assembly of FIG. 2 with the duckbill in an insert position.
Figure 4:
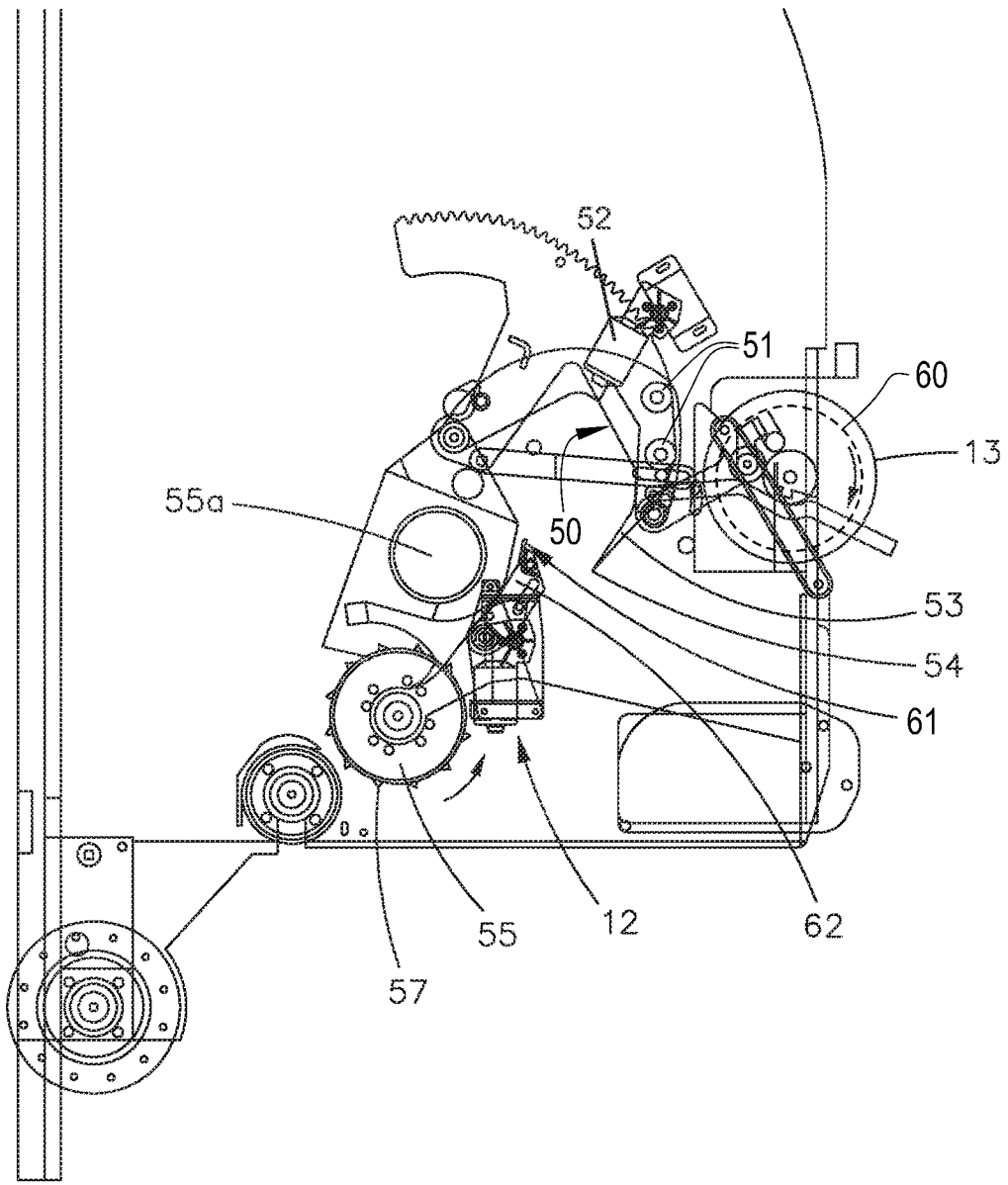
FIG. 4 illustrates a side view of the wrapping assembly of FIGS. 2-3 with a knife assembly in a cut position.
Figure 5:
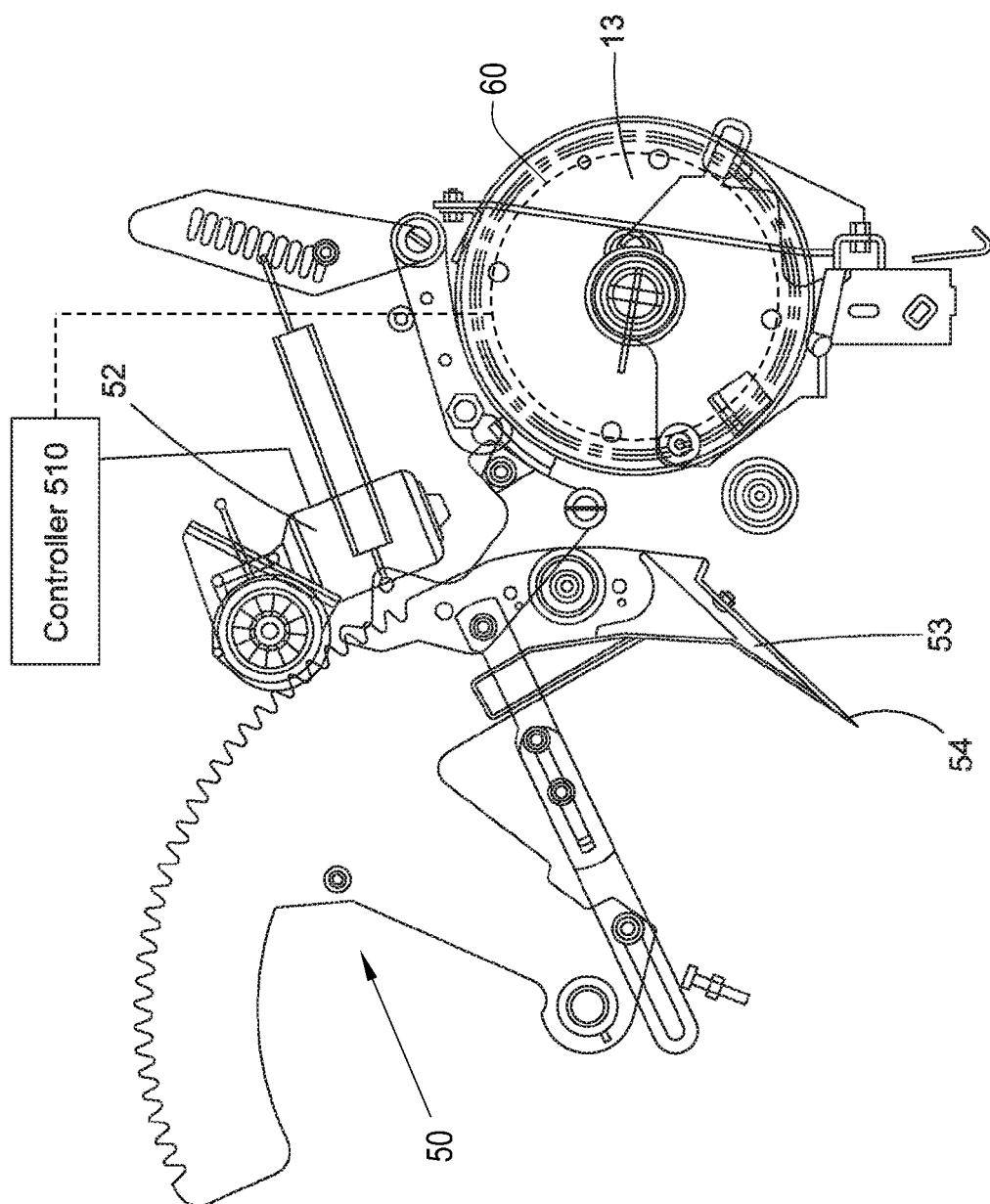
FIG. 5 illustrates a side view of the wrapper system of FIGS. 2-4 with the duckbill in the home position.

FIGS. 2-4 show an exemplary embodiment of the bale wrapping system comprising wrapping assembly 11 and net cutting assembly 12. As shown, the wrapping assembly 11 includes a material roll 13, a duckbill assembly 50 including at least one duckbill roll, illustrated as multiple duckbill rolls 51, carried by a duckbill 53, and a duckbill actuator 52 coupled to the duckbill 53. Bale chamber rolls 55 facilitate the forming of the bale and wrapping of the bale with the net. (Reference numeral 55a is used to denote the location of the axis of a bale chamber roll, which is not shown, for clarity.) The net cutting assembly 12 may include a knife 61 and a knife duckbill 62.

The wrapping assembly 11, including the duckbill assembly 50 and its associated structure and mechanisms may be conventional and common to the structure and operation described in the baler patents referenced and incorporated herein by reference above.

As shown, the wrapping material, such as net, may be fed from the material roll 13 and travel over the duckbill rolls 51 and exit a tip 54 of the duckbill 53. The tip 54 of the duckbill 53 serves to pinch the net and prevent the net from snapping back through the duckbill 53 once it is cut. Typically, a portion of net will extend out of the tip after a net cutting action. For example, it is common for a section of net that hangs out of the tip of the duckbill and that net tail is where it grabs on to the bale when the duckbill 53 is inserted for the next net wrapping cycle.

As shown, the duckbill actuator 52 may be dedicated to the duckbill 53, and operation of the duckbill actuator 52 functions to insert the duckbill 53 to commence a net wrapping cycle and then to retract the duckbill 53 at the end of the wrapping cycle once the net has been cut. The duckbill actuator 52 is thus configured to move the duckbill 53 between a first position, which may be an insert position, and a second position, which may be a home position, during retraction of the duckbill 53. The duckbill actuator 52 may be, for example, a motor that is powered by electricity, hydraulics, and/or pneumatics, as is known. The duckbill rolls 51 function to define the path of the net as it weaves through the duckbill assembly 50 and to ensure the net is stretched to one side of the bale to the other side of the bale. In the operation of the illustrated wrapping assembly 11, the net comes off the bottom of the material roll 13, which, in the figure, rotates clockwise, and goes around the upper side of the upper duckbill roll 51 and then makes essentially an 180-degree turn and then goes on the material roll side of the lower duckbill roll 51 and then through the tip 54 of the duckbill 53. A variable brake 60 is associated with the material roll 13 and is configured to apply a variable braking force to the material roll 13 to reduce or prevent rotation of the material roll 13, as will be described further herein. The rotational direction of the material roll 13 is unimportant, but ultimately determines the location where the net leaves the roll, and/or the number and placement of additional rolls needed to direct the net appropriately to the duckbill, and eventually rearward, toward the baling chamber. The front of the baler is indicated by arrow 56.

The bale chamber roll 55 closest to the up-cut net knife assembly 12 may include ribs 57 disposed about the outside of the roll. A bale chamber roller 55 positioned above this roller (not shown) may also include ribs. A gap or clearance may be formed between these two bale chamber rollers 55 to allow access for the tip 54 of the duckbill 53. As the bale chamber roll 55 rotates, the net pinches between the rolls and the bale and ribs 57 help grabs the net and feed it into the bale chamber and onto the bale. In the illustrated embodiment, the bale may rotate such that the top material moves forward and downward, with respect to the baler, clockwise as shown in the figure, in the chamber and the bale chamber rolls 55 rotate in the opposite direction, here counterclockwise.

FIG. 2 illustrates the wrapping assembly 11 and the knife assembly 12 in the home position. FIG. 3 illustrates the duckbill 53 in the insert position. FIG. 4 illustrates the wrapping assembly 11 again in the home position with the knife assembly 12 in the cut position.

During a net wrapping cycle, the wrapping assembly 11 moves through two positions: the home position to the insert position and back to the home position. In the home position (FIG. 2), the duckbill 53 of the wrapping assembly 11 is in the raised or home position. The home position is typically employed at the time a bale is being formed. At some point in time, the bale forming operation is completed and the time to wrap the bale occurs. At this time, the duckbill 53 of the wrapping assembly 11 is lowered to the insert position (FIG. 3), where the duckbill 53 rotates into the baling chamber. The duckbill tip 54 fits in between upper and lower bale chamber rolls 55 (the upper roll is not shown for clarity, but its location is marked 55*a*), and the net is pinched between the bale and the lower roll causing the net to start to feed on to the bale. Sensors (not shown) may be provided to determine when the net is flowing on to the bale. Once it is determined that the net has started wrapping on the bale, the duckbill 53 is retracted out of the bale chamber and returns to the duckbill home position (FIG. 4). Completion of the net wrapping may be determined using sensors and/or via passage of a specified time period. At this point in the net wrapping cycle, the net is still flowing out of the duckbill 53 to the bale chamber. It is also time to cut the net, the operation of which is performed by the knife assembly 12.

In known balers, the material roll may be provided with one or more brakes that provide resistance to rotation of the material roll. This resistance acts to maintain or increase tension in the wrapping material, especially when the bale chamber rolls pinch the material and draw it toward the baling chamber. While it is possible to adjust the brake to control net tension, the dynamics of the system require a tolerance band around the feedback signal to prevent the brake from "chasing" the tension feedback signal. In some cases, the required tolerance zone for adjustment is larger than the desired control limits, which can make it difficult to ensure the net tension remains at the desired level.

To address some of the previously described issues, and referring now to FIGS. 5-7A, the wrapping assembly 11 includes a controller 510 that is operatively coupled to the duckbill actuator 52 and the brake 60. The controller 510 is configured to determine an averaged electric current draw, illustrated as a dashed line CD1 in FIGS. 6B and 7A, of the duckbill actuator 52 during a sampling period 501 is below a defined value DV (illustrated in FIG. 7A) and output a brake increase signal so the brake 60 increases applied braking force to the material roll 13 by a defined amount when the averaged electric current draw CD1 is below the defined value DV. As used herein, an "averaged electric current draw" is derived from a plurality of current draw values, i.e., a single current draw value is not equivalent to an "averaged electric current draw." The controller 510 may be configured to determine the electric current draw of the duckbill actuator 52 in a variety of ways, including by receiving one or more signals from a component of the duckbill actuator 52 that corresponds to the electric current draw of the duckbill actuator 52.

Figure 6A:
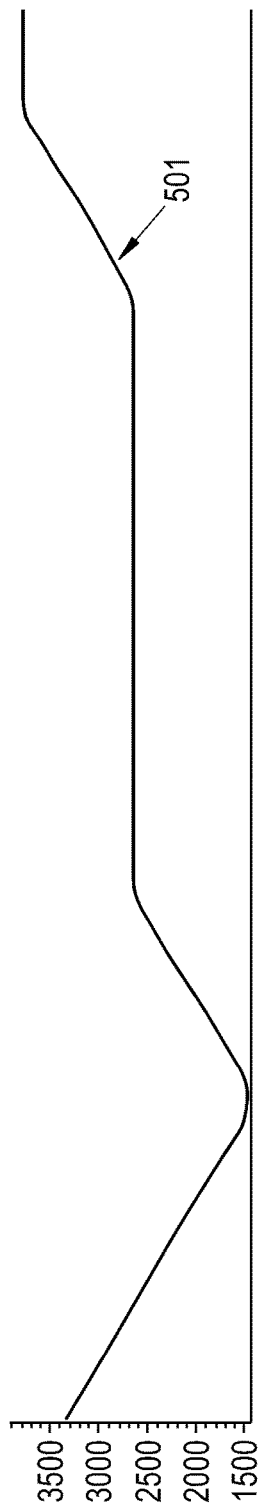
FIG. 6A is a graphical representation of an exemplary time-position plot of a duckbill actuator coupled to the duckbill during operation.
Figure 6B:
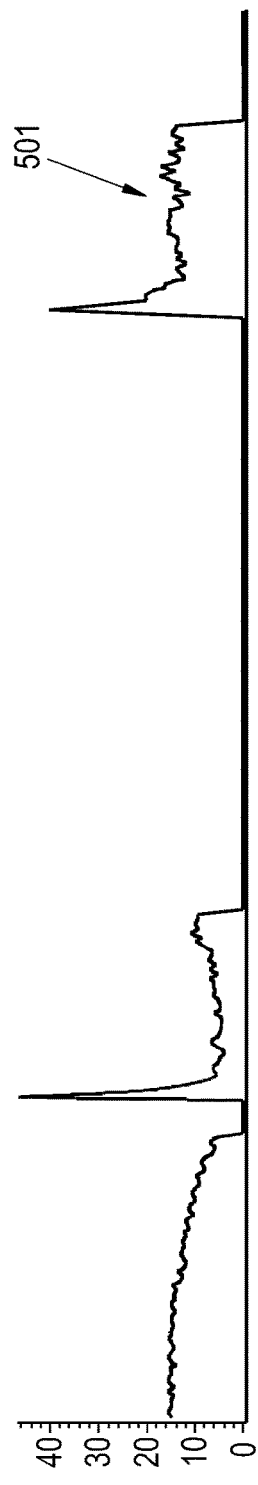
FIG. 6B is a graphical representation of current drawn by the duckbill actuator while moving according to the time-position plot of FIG. 6A.
Figure 6C:
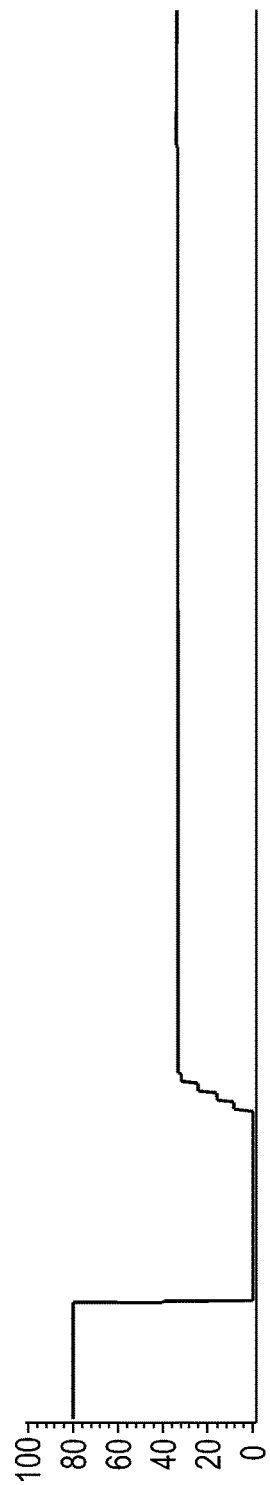
FIG. 6C is a graphical representation of applied braking force from a brake of the wrapping assembly during the time-position plot of the duckbill actuator of FIG. 6A.

As can be appreciated from comparing FIG. 6A, which illustrates the position of the duckbill actuator 52 over time, to FIGS. 6B and 6C, the sampling period 501 may occur as the duckbill actuator 52 moves the duckbill 53 from the insert position to the home position, corresponding to the duckbill retraction phase of the net wrapping cycle. The sampling period 501 may define a defined time interval, e.g., a defined amount of time after the duckbill actuator 52 begins to move away from or toward the home position, a time period during a defined position change of the duckbill 53, e.g., how long it takes for the duckbill actuator 52 to move the duckbill 53 from a first position to a second position, and/or a defined position range of the duckbill actuator 52 that is independent of time. The averaged electric current draw of the duckbill actuator 52 may be determined by adding together each electric current draw of the duckbill actuator 52 measured during the sampling period 501 and dividing the sum by the number of electric current draw measurements. The sampling period 501 may be manually defined by a user and/or automatically defined by the controller 510. It should thus be appreciated that the sampling period 501 may be defined in a variety of ways to establish a period for defining the averaged electric current draw CD1.

Figure 7A:
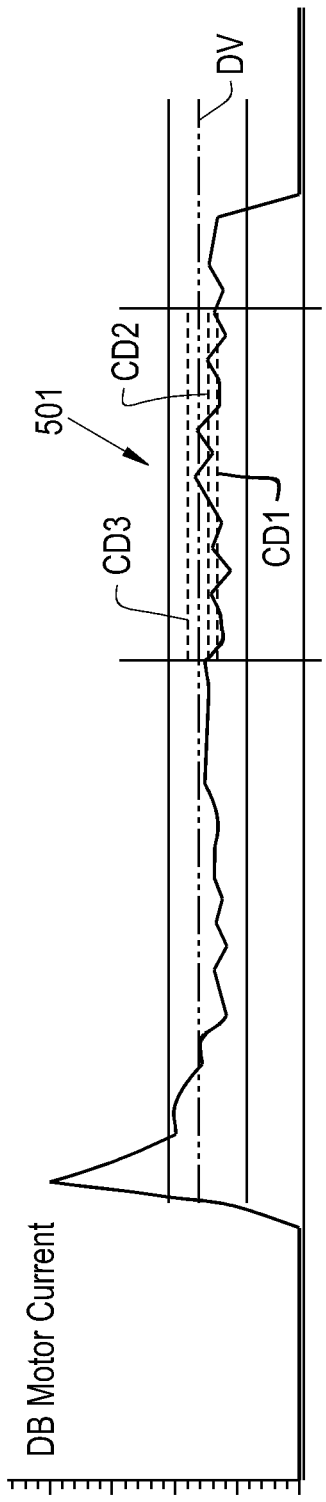
FIG. 7A is a close-up view of a portion of the graphical representation of FIG. 6B.
Figure 7B:
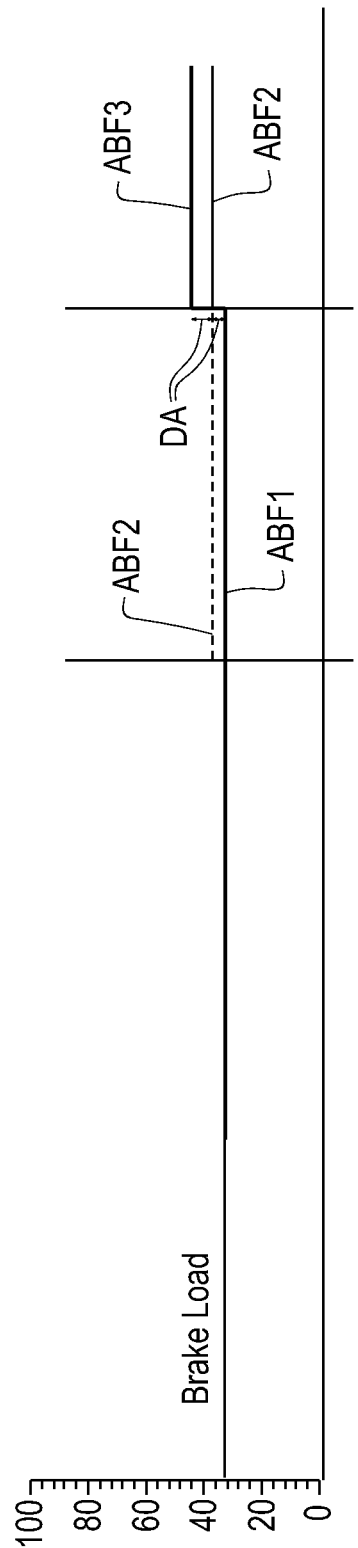
FIG. 7B is a close-up view of a portion of the graphical representation of FIG. 6C.

The duckbill actuator 52 draws more current to counteract tension in the wrapping material, in order to pull the wrapping material, so a higher current draw by the duckbill actuator 52 corresponds to a greater tension in the wrapping material, and vice versa. The defined value DV can thus be defined, manually by a user and/or automatically by the controller 510, to a value where an averaged electric current draw of the duckbill actuator 52 corresponds to a defined level of tension in the wrapping material, such as 90-100 pounds of tension. Referring specifically now to FIGS. 7A and 7B, close-up views of the graphical representations of FIGS. 6B and 6C, respectively, are illustrated. As illustrated in FIG. 7A, the averaged electric current draw CD1 of the duckbill actuator 52 is below the defined value DV, which indicates that the tension in wrapping material from the material roll 13 is too low. To compensate, the controller 510 outputs a brake increase signal so applied braking force ABF1 from the brake 60 to the material roll 13 increases by a defined amount DA, which may be no more than 3% of the applied braking force ABF1 so the increase in applied braking force is not too great, when the averaged electric current draw CD1 is below the defined value DV. By increasing the applied braking force ABF1 by the defined amount DA, the brake 60 applies a second applied braking force ABF2 to the material roll 13, which results in a second averaged electric current draw CD2 of the duckbill actuator 52 during a subsequent second sampling period 501 that is greater than the averaged electric current draw CD1, indicating that tension in the wrapping material has increased due to the increase in the applied braking force. In some embodiments, the brake 60 is an electric brake that increases the applied braking force ABF1 in response to electrical signals and the controller 510 outputs the brake increase signal to the brake 60 to increase the applied braking force ABF1, ABF2. In such an embodiment, the controller 510 may be configured to adjust the applied braking force ABF1, ABF2 through pulse-width modulation, according to known techniques.

However, since the second averaged electric current draw CD2 of the duckbill actuator 52 is still below the defined value DV, the controller 510 may be configured to determine the second averaged electric current draw CD2 of the duckbill actuator 52 is below the defined value DV and output a second brake increase signal so the brake 60 increases the second applied braking force ABF2, which may also be referred to as simply the "applied braking force" because it is the braking force applied at the time of sampling, to the material roll 13 by a second defined amount, which may be equal to the defined amount DA, when the second averaged electric current draw CD2 is below the defined value DV. In this respect, increasing the applied braking force ABF2 by the defined amount DA to a third applied braking force ABF3 can further increase the tension in the wrapping material pulled from the material roll 13 so a third averaged electric current draw CD3 of the duckbill actuator 52 is greater than the defined value DV, which indicates acceptable tension in the wrapping material and no need for further increases in the applied braking force ABF1, ABF2, ABF3. In this respect, the controller 510 can cause progressive increases in the applied braking force ABF1, ABF2, ABF3 until the averaged electric current draw of the duckbill actuator 52 during the sampling period 501 is at least the defined value DV, indicating acceptable tension in the wrapping material so the applied braking force does not need to be increased. Otherwise, the controller 510 can continue averaging the electric current draw of the duckbill actuator 52 and outputting the brake increase signal to increase the applied braking force by the defined amount as necessary until the average electric current draw of the duckbill actuator 52 during the sampling period 501 is at least equal to the defined value DV.

It should be appreciated that while the defined amount DA is illustrated as being a constant amount for each increase in the applied braking force, i.e., resulting in a linear increase in the applied braking force, the defined amount DA may also be a variable amount. For example, the defined amount DA may be 1% of the applied braking force so the applied braking force can be exponentially increased. If the applied braking force ABF1 is, for example, 100 units, the defined amount DA may be 1% of 100 units (1 unit) so increasing the applied braking force ABF1 by the defined amount DA to the second applied braking force ABF2 results in the second applied braking force ABF2 being 101 units. The defined amount DA, taken as 1% of the second applied braking force ABF2, would then be 1% of 101 units (1.01 units) so increasing the second applied braking force ABF2 by the defined amount DA to the third applied braking force ABF3 results in the third applied braking force ABF3 being 102.01 units. It should be further appreciated that, if the defined amount DA is a percentage of the applied braking force, the defined amount DA can be a different percentage between two different increases in the applied braking force, e.g., the defined amount can be 1% of the applied braking force in a first increase of the applied braking force and 1.2% of the applied braking force in a subsequent increase of the applied braking force. It should thus be appreciated that the defined amount DA by which the applied braking force is increased can be altered in a variety of ways according to the present disclosure.

From the foregoing, it should be appreciated that the controller 510 provided according to the present disclosure can increase the braking force applied by the brake 60 on the material roll 13 responsively to determining the averaged current draw of the duckbill actuator 52, which corresponds to tension in the drawn wrapping material, is below the defined value DV. In this respect, the controller 510 can control the brake 60 so incremental increases to the applied braking force are made so the applied braking force, and corresponding wrapping material tension, stay within a desired range. Thus, embodiments provided according to the present disclosure can continuously adjust the brake 60 to keep a braking force applied to the material roll 13 so the tension on the wrapping material stays at a desired level.

Figure 8:
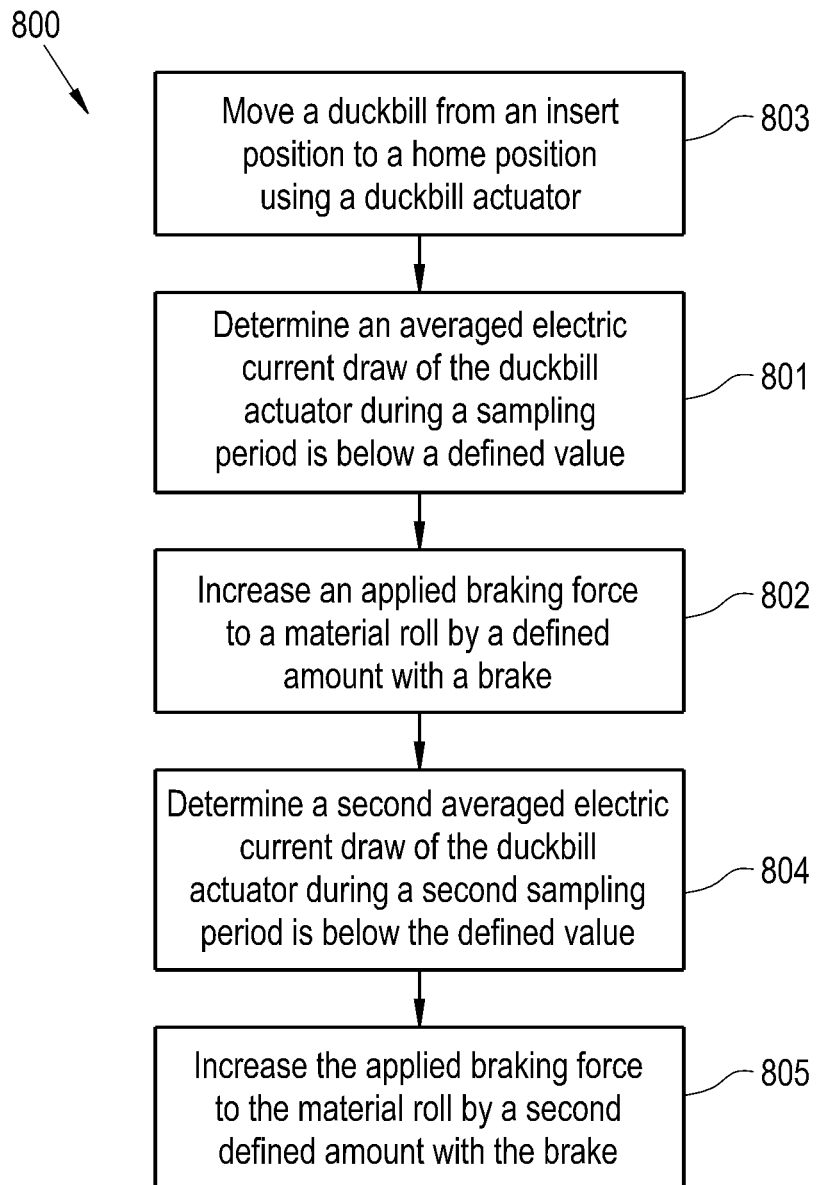
FIG. 8 illustrates a flowchart of an exemplary embodiment of a method for controlling a wrapping assembly, provided in accordance with the present disclosure.

Referring now to FIG. 8, an exemplary embodiment of a method 800 of controlling a wrapping assembly 11 provided according to the present disclosure is provided. The method 800 includes determining 801 an averaged electric current draw ACD1, ACD2 of a duckbill actuator 52 during a sampling period 501 is below a defined value DV and increasing 802 an applied braking force ABF1, ABF2 to a material roll 13 by a defined amount DA, which may be no more than 3% of the applied braking force ABF1, ABF2, with a brake 60 when the averaged electric current draw ACD1, ACD2 is below the defined value DV. In some embodiments, the defined amount DA is 1% of the applied braking force ABF1, ABF2. As previously described, the sampling period 501, the defined amount DA, and the defined value DV may be adjusted as desired. The method 800 may further include moving 803 a duckbill 53 from an insert position to a home position using the duckbill actuator 52, with the sampling period 501 occurring as the duckbill actuator 52 moves the duckbill 53 from the insert position to the home position, i.e., during a retraction phase of the wrapping cycle. The method 800 may further include subsequently determining 804 a second averaged electric current draw CD2 of the duckbill actuator 52 during a second sampling period is below the defined value DV and responsively increasing 805 the applied braking force ABF2 to the material roll 13 by a second defined amount, which may or may not be equal to the defined amount DA, which may be no more than 3% of the applied braking force ABF2, when the second averaged electric current draw CD2 is below the defined value DV. In this respect, the method 800 can be performed to continuously increase the applied braking force ABF1, ABF2 responsively to the averaged electric current CD1, CD2, being below the defined value DV to keep desired tension in drawn wrapping material. In some embodiments, the method 800 is entirely or partially performed by the controller 510, with or without user input.

It is to be understood that the steps of the method 800 may be performed by the controller 510 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 510 described herein, such as the method 800, may be implemented in software code or instructions which are tangibly stored on a tangible computer readable medium. The controller 510 loads the software code or instructions via a direct interface with the computer readable medium or via a wired and/or wireless network. Upon loading and executing such software code or instructions by the controller 510, the controller 510 may perform any of the functionality of the controller 510 described herein, including any steps of the method 800 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A method of controlling a wrapping assembly of an agricultural baler, the wrapping assembly comprising a material roll holding a roll of wrapping material, a duckbill assembly comprising a movable duckbill carrying at least one duckbill roll and configured to draw wrapping material from the roll of wrapping material, a duckbill actuator coupled to the duckbill, and a variable brake coupled to the material roll, the method comprising:

determining an averaged electric current draw of the duckbill actuator during a sampling period is below a defined value;
 increasing an applied braking force to the material roll by a defined amount with the brake when the averaged electric current draw is below the defined value;
 determining a second averaged electric current draw of the duckbill actuator during a second sampling period is below the defined value; and
 increasing the applied braking force to the material roll by a second defined amount with the brake when the second averaged electric current draw is below the defined value.

2. The method of claim 1, further comprising moving the duckbill from an insert position to a home position using the duckbill actuator, the sampling period occurring as the duckbill actuator moves the duckbill from the insert position to the home position.

3. The method of claim 1, wherein the sampling period defines at least one of a defined time interval, a time period during a defined position change of the duckbill, or a defined position range of the duckbill actuator.

4. The method of claim 1, wherein the defined amount is no more than 3% of the applied braking force.

* * * * *